United States Patent [19]

McVoy

[11] 4,207,431
[45] Jun. 10, 1980

[54] APPARATUS AND METHOD FOR MONITORING A COMMUNICATIONS SYSTEM

[75] Inventor: David S. McVoy, Columbus, Ohio

[73] Assignee: Broadband Technologies, Inc., Sarasota, Fla.

[21] Appl. No.: 835,981

[22] Filed: Sep. 23, 1977

[51] Int. Cl.² .................................................. H04B 17/00
[52] U.S. Cl. ........................ 179/1 MN; 179/175.3 R; 324/57 R; 324/58 R; 455/67; 358/139
[58] Field of Search ................................... 179/1 MN

[56] References Cited
U.S. PATENT DOCUMENTS

| 2,214,130 | 9/1940 | Green et al. | 179/175.3 R |
| 3,557,323 | 1/1971 | Chalhoub | 179/175.31 R |
| 3,920,935 | 11/1975 | Vierling et al. | 179/175.3 R |

Primary Examiner—George G. Stellar
Attorney, Agent, or Firm—Wender, Murase & White

[57] ABSTRACT

Apparatus and method for monitoring the quality and integrity of a communications system, such as a cable television system, which includes several monitoring circuits placed throughout the system to detect and amplify RF or audio frequency signals received at any number of selected points. The detected signals are used to amplitude modulate a continuous wave oscillator at a selected one of several discrete frequencies identifiable with the position of the monitoring circuits. The modulated CW signals are then fed upstream for processing at a central location. Each monitoring network includes a broadband detector so as to enable the detection of one or more discrete frequency signals or a band of signals. The use of several discrete frequency signals for normal monitoring purposes allows reliable monitoring to be carried out on a continuous basis without casing interference to the information signals being transmitted through the system. If a fault or deviation is detected, a swept band of signals can be fed into the system whereupon the monitor circuits will detect the entire band and return to the central point a full frequency response pattern to facilitate detailed analysis.

7 Claims, 3 Drawing Figures

APPARATUS AND METHOD FOR MONITORING A COMMUNICATIONS SYSTEM

BACKGROUND OF THE INVENTION

1. Field of the Invention

The present invention relates to communications systems, and more particularly, to a method and apparatus for monitoring the quality and integrity of such system at selected points from a central position.

2. Description of the Prior Art

In communications systems where data (digital or analog) are sent from a central point to a number of terminal points for the reliable transmission of information, it is desirable to easily and conveniently monitor the performance of the system on a routine basis. To accomplish this requires the monitoring of system performance at a number of terminal points. In a cable television system, for example, it is desirable to monitor the end of each main cable or trunk as well as the ends of each of the branch or feeder cables. In addition, it is desirable to monitor the condition of the system at the location of intermediate amplifiers, which are known to be prone to faults and malfunctions. Since a cable television system may have several trunk lines, each supplying many feeder lines, the number of monitoring networks which are required for full system observation is extremely large. Therefore, it is quite important to keep the costs of the monitoring circuits to a minimum and to assure reliability and ease of maintenance.

In the development of cable television systems, it was initially recognized that the financial outlay for monitoring equipment would be extremely high and, at the outset, could not be justified. Thus, during the early stages of cable television development, system monitoring was accomplished by the cable subscribers themselves. While this was satisfactory, in the sense that the cable operators were notified of system faults without having to bear the expense of separate monitoring equipment, it was highly unsatisfactory in that there was no way of protecting the consumer from exposure to fault situations. In fact, it not only exposed the consumer to frequent programming disruptions, but obligated the consumer to complain before a fault would be corrected.

As cable systems increased in popularity, and technological innovations brought improvements throughout the system, approaches were taken to provide system monitoring independent of the consumer. Generally speaking, the approaches most often considered in the prior art were based on the periodic transmission of test signals through the system for monitoring by technicians at different locations. This allowed cable operators to reliably monitor cable operation but presented a different set of disadvantages. The primary disadvantage was that manpower was required to travel to each cable terminal point, to tap into the cable, and to take readings for on-the-spot or subsequent analysis. Moreover, since the test signals had to be transmitted through the system for the duration of the testing procedure, interference with normal communications often resulted, so that the entire testing operation had to be restricted to early morning hours before the start of the broadcast day.

Recent developments have shown that coaxial cable systems are capable of providing two-way communications between a central point (headend) and each terminal point. For example, in addition to the RF carriers sent out from the central point to the terminal points, data can be sent back to the headend over the cable system from the terminal points. By convention, communications from the central point to a number of terminal points are called forward direction communications. Likewise, communications from terminal points back to the central point are called reverse communications. Most two-way CATV systems employ a single cable for communications in both the forward direction and the reverse direction by utilizing spectrum splitting filters where the high end of the spectrum carries the forward direction communications and the low end of the spectrum carries the reverse communications. However, there are CATV systems that employ separate coaxial cables routed parallel to each other, where one is used for forward direction and another for reverse directions. In addition, combinations of the aforementioned methods are sometimes employed.

The advent of such two-way CATV systems has opened the door to central monitoring and, thus, has rekindled interest in this area. Attempts have been made to monitor the status of the system at various terminal points by utilizing the two-way capabilities of the system to transmit operational data in the reverse direction for analysis. This has presented several serious obstacles. One of these obstacles is the fact that test signals sent in the forward direction through the system cause interference with normal communications and information signals. Consequently, specialized forms of test signals have been proposed, but the resultant return signals often do not carry enough information to enable full analysis and monitoring of system operation. Another obstacle is the fact that several monitoring circuits are necessary at all of the various terminal points with the result that the number of reverse direction signals becomes difficult to efficiently manage and separately identify without resulting in circuit complexity of prohibitive cost.

U.S. Pat. No. 3,287,715 discloses an indicator system in which a continuous wave oscillator is amplitude modulated by a signal proportional to a locally measured variable. Each remote unit in the system has a predetermined assigned frequency, and all units can be scanned by sequencing from one frequency to the next. The patent does not disclose a system which can detect RF signals as they are actually received at different points for monitoring, but rather, more closely resembles conventional telemetry equipment well known in the art.

An example of such a telemetry-type system is shown in U.S. Pat. No. 3,289,078. In this patent, a measured variable is used to amplitude modulate an oscillator, and the output of the oscillator is transmitted to a central or control location in response to a designated command. This patent does not disclose a system for monitoring the downstream output of a communications system and transmitting such output upstream for analysis.

U.S. Pat. No. 3,651,403 discloses a simultaneous sweep testing system for cable TV. In this system, the test signal applied to the cable is in the form of a series of discrete frequency-swept pulses of short duration. These signals do not interfere with the information signals appearing in the system, but actual examination of signals must still take place at the physical location of each monitor. The patent discloses no circuitry for modulation and retransmission of signals upstream for analysis at a central point.

Another patent which shows the transmission of a swept test signal along a cable network is U.S. Pat. No. 3,978,282. This patent is limited to its disclosure of the test signal transmission network and does not describe circuitry for providing reverse direction transmission of swept signals for headend analysis.

U.S. Pat. No. 4,031,543 discloses a pay TV system with provisions for monitoring cable quality. The system relies on the random transmission of remote signals which are subsequently received and analyzed by computer at the headend.

While the prior art, as exemplified by the above patents, has attempted several solutions to the problem of economical and reliable communications systems monitoring, a fully satisfactory system heretofore has not been developed.

SUMMARY OF THE INVENTION

It is, therefore, an object of the present invention to monitor the operative condition of a communications system from a central location.

Another object of this invention is to transmit back to a central location signals detected at various points in a communications system for analysis of system operation.

A further object of the present invention is to monitor the operation of a two-way cable television network by detecting signals received at selected points and transmitting a reproduction of such detected signals back to the system headend at a discrete carrier frequency identifiable with the location of each monitor. This invention has another object in the economical use of monitoring circuits capable of detecting a frequency swept signal so as to increase the scope of measurements taken and transmitted back through the system for analysis.

The present invention is summarized as a monitoring method and system including a circuit for generating test signals having a plurality of frequencies falling within a particular frequency band and transmitting the test signals through a communications system; at least one monitor circuit in communicative connection with the test signal generator and disposed at a preselected point in the system, the monitor circuit including a detector for detecting all signals in the frequency band as received at the preselected point, an oscillator for generating a carrier signal at a discrete fixed frequency, and a modulator coupled to the detector and oscillator for modulating the carrier with the detected signals; and a signal analysis network in communicative connection with the monitor circuit and disposed at a position remote therefrom to receive and analyze the modulated carrier, whereby signals appearing at preselected points throughout the system may be examined at a central location to enable central monitoring of the operative status of the system.

Several advantages are exhibited by the present invention including central monitoring of an entire communications system without interference, the capability of examining full dynamic frequency response of individual portions of the system from a central location, the ability to monitor any number of points in the system rapidly and continuously without perceptible interference, and achievement of total system monitoring at a reasonable cost.

Other objects and advantages of the present invention will become apparent from the following description of the preferred embodiments when taken in conjunction with the accompanying drawings.

DESCRIPTION OF THE PREFERRED EMBODIMENTS

Figure 1:
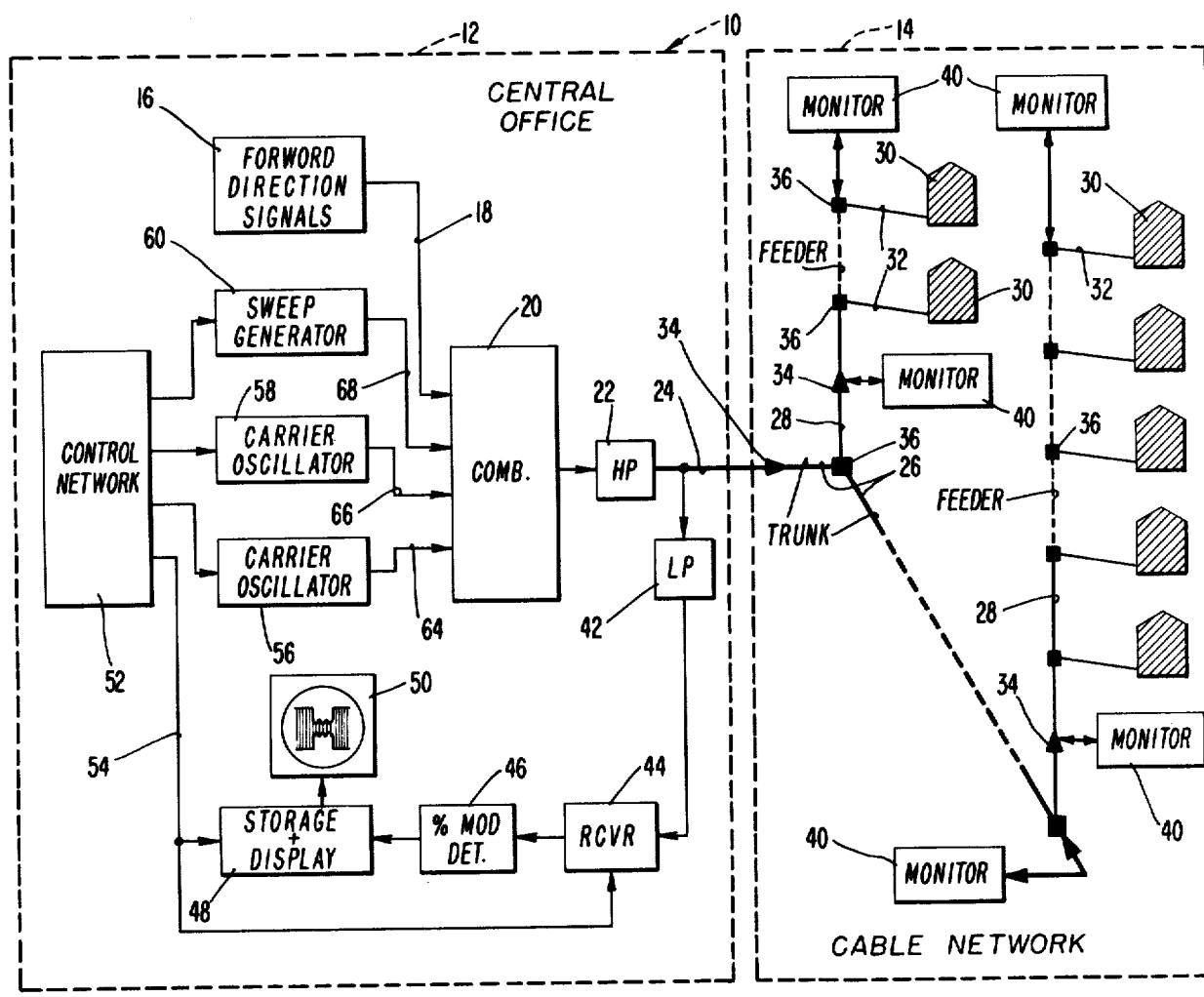
FIG. 1 is a simplified block diagram of a preferred embodiment of a cable television system embodying monitoring apparatus in accordance with the present invention.

A monitoring system in accordance with the present invention is embodied in a communications system, designated generally by numeral 10, and illustrated in FIG. 1. The communications system 10 preferably is of a coaxial cable type, it being understood that other types of transmission systems or means may be used, for example, telephone lines or microwave transmission between line-of-site towers, and the like. Also, it will be understood that multi-cable coaxial systems can incorporate the novel aspects of this invention, a single cable system being illustrated and described solely for the sake of clarity and brevity.

The communications system 10 includes a central office or headend network 12 supplying a cable network 14. In the central office 12, the normal information or communications signals intended to be transmitted throughout the network are generated by forward direction signal generating equipment, represented by block 16. In a cable television network, such equipment would include television cameras, video tape recorders, amplifiers, controllers, interconnecting cable networks, and the like. All of this equipment is conventional and may take any suitable form designed to supply information signals on line 18 to a combining network 20. The output of the combining network 20 preferably lies within the frequency band of 50–300 mHz and is fed through a high pass filter 22 to the main trunk cable 24. These signals are generally referred to as forward direction signals and carry information intended to be transmitted from the central office to system subscribers connected to the cable network.

Cable network 14 consists of one or more trunk cables 26 which are fed from the main trunk 24 from the central office 12. The trunk cables in turn supply several feeder cables 28 which extend throughout the geographic area served by the system. Each feeder cable supplies signals to several individual subscribers 30 who are coupled to the system by drop lines 32. Throughout the system, amplifying devices 34 are provided to boost signal strength and otherwise compensate for cable losses. The network also includes several signal splitting and tap off networks 36 to allow the various cable links to be interconnected with minimal signal disturbance. Amplifier 34 and tap off devices 36 may be of any suitable design well known to those of ordinary skill in the art.

In a two-way cable television network, each of the individual subscribers 30 is provided with a television receiver and circuitry designed not only to enable forward direction signals to be received and displayed, but also to permit the development of reverse direction signals for transmission back through the cable to the central office. Preferably, reverse direction signals are limited to the band of 5–30 mHz to minimize the interference in the cable. The reverse direction signals may contain any number of different types of information relating not only to consumer use of the system, but also to the occurance of an emergency condition, such as fire, theft, etc.

In accordance with the present invention, the cable network 14 may be provided with one or more monitor circuits 40 placed wherever signal examination is desired. It is preferred that a monitor circuit be provided at the terminal point of each feeder line 28, the terminal point of each trunk line 26, the location of each bridger amplifier 34, and, if desired, the location of any or all of the other amplifiers in the system. The monitor circuits according to this invention receive all forward direction signals sent downstream through the system, detect such received signals, and modulate the output of a continuous wave oscillator with the detected signals for transmission back to the cental office in the reverse direction. The CW oscillators of each monitor network are tuned to a different discrete frequency lying within the reverse direction passband of 5–30 mHz.

The reverse direction signals sent upstream by the monitor networks 40 are passed through a low pass filter 42 at the central office 12. The signals at the output of filter 42 are fed to a receiver 44 which, in turn, supplies output signals to a percent modulation detector 46. The output of the percent modulation detector 46 feeds a storage and display circuit 48 including an oscilloscope 50 for the visual examination of received signals by a central office operator. A control network 52 is coupled via line 54 to the storage and display circuit 48 as well as receiver 44. The control network may be provided with appropriate switching circuits to enable manual or automatic sequencing of the receiver 44 for the display of return signals from each individual monitor circuit 40 in the cable network 14.

The control network 52 also may be provided with manual or automatic switching circuits for controlling the operative status of a first fixed frequency carrier oscillator 56, a second fixed frequency carrier oscillator 58 and a sweep frequency generator 60. While only two fixed frequency carrier oscillators have been shown and described, it should be appreciated that any number of such oscillators can be provided in accordance with the present invention. Oscillators 56 and 58 and sweep generator 60 are coupled to control network 52, as shown in FIG. 1, and supply output signals over lines 64, 66, and 68, respectively, to combiner 20 for transmission in the forward direction to cable network 14. Each of the two carrier oscillators 56 and 58 provide output signals lying within the forward direction passband of 50–300 mHz, and sweep generator 60 is designed to provide a frequency swept signal, i.e., a signal whose frequency changes with time, which extends partially or completely through the forward direction passband. The output amplitude levels of oscillators 56 and 58 and sweep generator 60 are such that each of the signals fed to combiner 20 has a precisely established amplitude lying with a range of approximately 10–15 decibels above that of the normally carried information signals provided to the system by network 16. In addition, so as to minimize interference, control network 52 is preferably designed to activate oscillators 56 and 58 so that short duration pulses are supplied to the combiner during a testing sequence.

As will be more fully described hereinbelow, each of the monitor circuits 40 includes a broadband detector which detects all of the RF energy appearing at each of the preselected points. Normally, the detector would detect energy from the 20–30 conventional signal carriers present on the system, and the remaining monitor circuitry would amplify such detected signals, modulate a carrier oscillator, and transmit the resultant signal back to the central office. During a monitoring or test sequence, the signals from oscillators 56 and 58, as well as sweep generator 60, will be similarly detected and transmitted back for analysis. However, since the amplitudes of the test signals lie within the range of approximately 10–15 db above that of the normally carried signals, the monitor circuits will have a substantially greater output from the test signals than from the normal signals. A sensitivity adjustment in each monitor is provided and can be preset so that the described energy returning to the central office as a result of the test signals will have a depth of modulation generally in the 10–70% range. Since the normally carried signals have much lower amplitudes than the test signals, this adjustment in sensitivity will result in a much lower percentage of modulation—typically 2–3%—in the detected energy returned from the normally carried signals.

Figure 2:
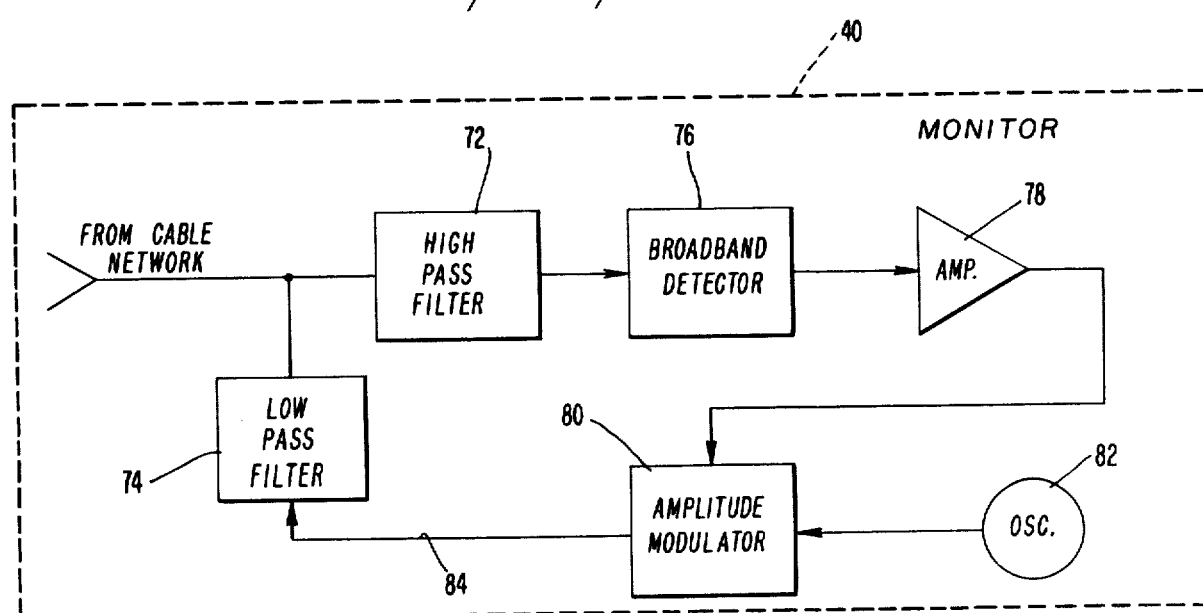
FIG. 2 is a simplified block diagram of one of the monitoring networks of the system of FIG. 1, according to the present invention.

Referring now to FIG. 2, each individual monitor circuit 40 includes a spectrum splitting filter consisting of a high pass filter section 72 and a low pass filter section 74. The high pass filter 72 is connected at an input to the cable network and supplies forward direction signals to a broadband detector 76. The broadband detector 76 detects the RF signals appearing on the cable from the central office or headend and feeds its detected output through an amplifier 78 to the input of an amplitude modulator 80. Amplitude modulator 80 is in turn coupled to a continuous wave oscillator 82 having a frequency lying within the return direction passband of 5–30 mHz. The amplitude modulated output of oscillator 82 is then applied over line 84 to the input of low pass filter 74 which couples the signals back to the cable network, as shown.

The individual circuits of monitor network 40 receive operating potential from a 60 Hz power source (not shown) fed into the system from power stations within the cable network. The transmission of 60 Hz operating potential through a two-way coaxial cable system is well known, and the present invention takes advantage of this existing power supply. It will be understood that any suitable power source may be used in connection with the monitor circuits of the present invention including individual connections to 60 Hz supplies, batteries, and the like.

Figure 3:
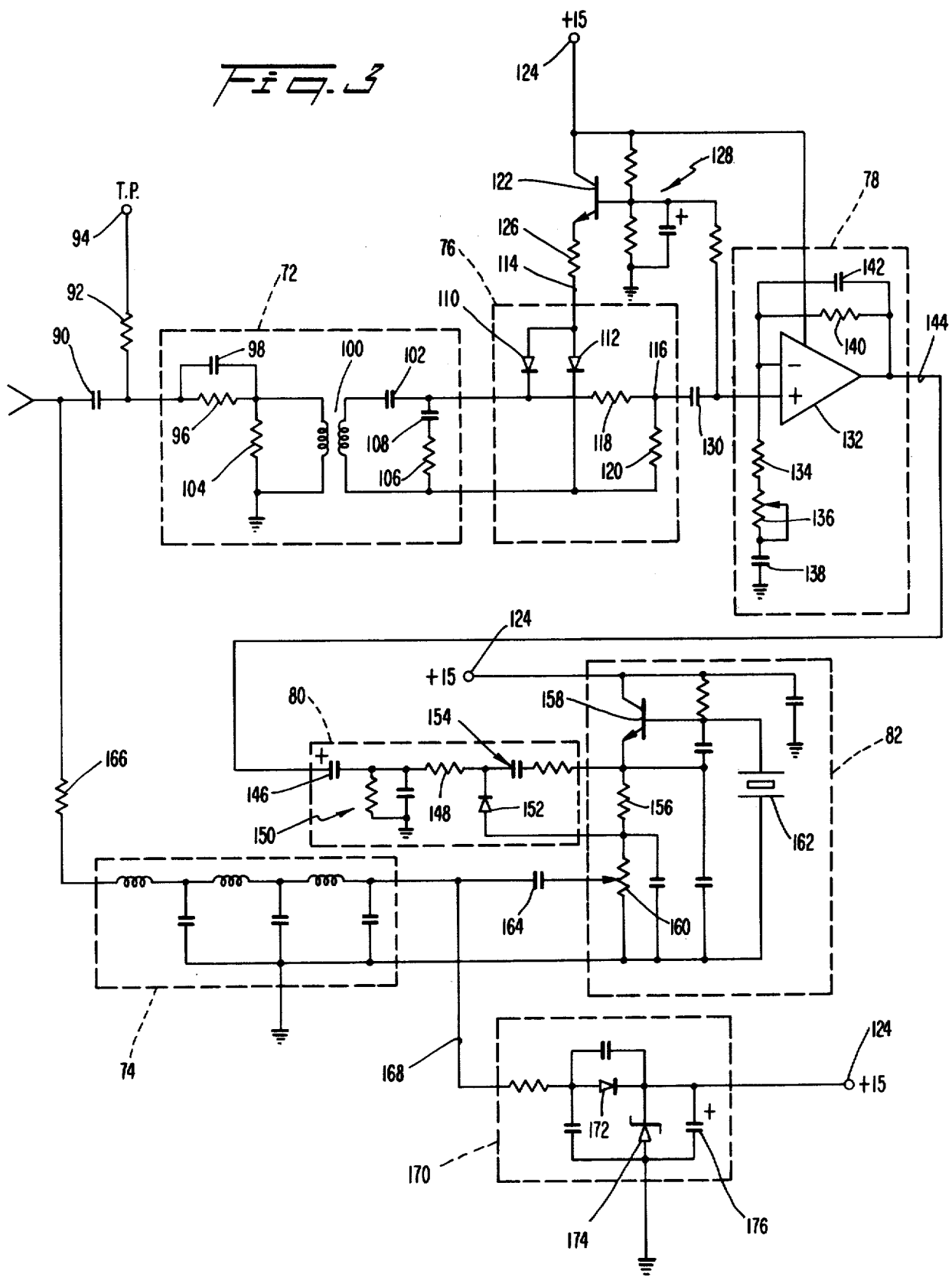
FIG. 3 is a schematic diagram of the monitoring network of FIG. 2, according to the present invention.

A schematic diagram of the monitor circuit of FIG. 2 is illustrated in FIG. 3. The cable to which the circuit is attached is coupled to the forward direction path of the monitor circuit by a coupling capacitor 90 which functions as an AC bypass to block the 60 cycle AC while at the same time passing the RF input signals. The output side of capacitor 90 supplies the input of high pass filter 72 and is also coupled through a voltage divider resistor 92 to a test point 94. High pass filter 72 consists of a parallel connected resistor 96 and capacitor 98 which are coupled through an independence matching transformer 100 to a capacitor 102. A resistor 104 is connected across the input winding of transformer 100, and a series network including a resistor 106 and a capacitor 108 is connected across the series circuit formed by the secondary winding of the transformer and capacitor 102. It can be appreciated that high pass filter 72 functions not only to pass signals within the forward direction band pass of 50–300 mHz but also as a matching network to terminate the cable system at the proper 75 ohm impedence.

Frequencies from 50–300 mHz are then presented to the broadband detector 76 which comprises a pair of diodes 110 and 112, the cathode electrodes of which are respectively connected to the junction of capacitors 102 and 108 and the lower end of resistor 106. The anode electrodes of the diodes are connected together to a regulated source of operating potential appearing on line 114. The output of the detector is provided at the junction 116 between a pair of resistors 118 and 120 which are respectively connected to the cathode electrodes of diodes 110 and 112. In the recited combination, diode 110 acts as the RF detector for the circuit and diode 112 provides temperature compensation.

A regulated supply of operating potential for biasing diodes 110 and 112 is provided by a transistor 122 whose emitter-collector path is connected between the monitor circuit DC supply, represented by terminal 124, and a resistor 126. The voltage regulator also includes a biasing network, generally indicated by numeral 128, for establishing the proper operating conditions for transistor 122 and the audio amplifier of amplifier network 78, to be described below.

The output of detector 76, which appears at junction 116, is AC coupled through capacitor 130 to the positive input of an audio amplifier 132. Amplifier 132 may be of any suitable design, such as an integrated circuit amplifier designed for use in amplifying audio frequency signals. The circuit receives operating potential from terminal point 124 and has its negative input connected through a series network formed of fixed resistor 134, variable resistor 136, and capacitor 138. Capacitor 138 is, in turn, coupled to ground to complete the circuit connection. Variable resistor 136 serves as a sensitivity control to establish the depth of modulation produced by the individual monitor circuit in response to the receipt of test signals sent down the cable.

A parallel circuit including a resistor 140 and a capacitor 142 is connected between the negative input of amplifier 132 and the output thereof. This network has a frequency response characteristic which rolls off at approximately 10 kHz to prevent unnecessary interference by high frequency audio signals, particularly those in the 20 kHz range.

The output of amplifier 132, on line 144, is fed to the input of amplitude modulator 80. Modulator 80 includes a coupling network consisting of a series connected capacitor 146 and resistor 148 together with a parallel RC network 150 which is coupled to ground. Resistor 148 is connected to the cathode of a modulating diode 152 which, through RC network 154, is connected across a resistor 156 of oscillator 82.

Oscillator 82 includes a transistor 158 having its collector-emitter path connected in series with resistor 156 and a further variable resistor 160 between power source 124 and ground. A crystal 162 is connected between the base of transistor 158 and ground such that the circuit oscillates at a fixed, discrete frequency determined by the crystal 162. The oscillator has an extremely stable output amplitude which is adjustable in level by variable resistor 160.

The modulated output signals from the wiper arm of potentiometer 160 are coupled through capacitor 164 to the input of low pass filter 74. Low pass filter 74 includes several LC stages which pass the reverse direction RF signals while attenuating harmonics of the crystal frequency. The output of low pass filter 74 is fed through a resistor 166 back to the cable for transmission upstream to the central office.

Coupling capacitor 164 between oscillator 82 and low pass filter 74 passes the modulated RF signals but blocks the AC applied to the cable. The AC signals are tapped off and fed on line 168 to a rectifier network 170 which includes a diode rectifier 172, a voltage regulating Zener diode 174, and a filter capacitor 176 connected as shown. The output of network 170 is taken from the cathode of diode 172 and fed through terminal 124 to the above described active elements in the circuit.

In operation, forward direction RF signals applied to the cable system will be received by each monitor circuit and will be directed through high pass filter 72 to the diode detector 76. Thus, frequencies from 50–300 mHz are presented to diodes 110 and 112 which serve as a stable, temperature compensated, broadband RF detector. The output of the detector is then AC coupled through capacitor 130 into audio amplifier 132.

Test signals applied to the system by carrier oscillator 56 or 58 appear at each monitor as momentary high level carrier signals. These signals, as detected by diodes 110 and 112, appear as pulses of DC energy which are passed through amplifier 132 and amplified to approximately 2 volts peak-to-peak. The output of amplifier 132 is then fed to diode modulator 80 for modulating the output of oscillator 82. In the normal mode, i.e., when no test signals appear in the cable system, diode modulator 152 is conducting so as to effectively bypass resisitor 156 of oscillator 82. The oscillator output is thus at a maximum or high level. When the test pulse is detected and fed by amplifier 132 to modulator diode 152, the diode is reverse biased to reduce the amount of RF energy bypassed around resistor 156. The amount of this reduction is directly proportional to the output level of amplifier 132 with the result that the output of oscillator 82 is pulled down in like proportion. The reduced conduction of modulator diode 152 therefore results in a reduction in the amount of RF energy inserted back on the cable system by the oscillator 82. In this manner, the monitor circuit amplitude modulates the oscillator output in proportion to the level of the test signals as received at the particular location of the monitor. It should be understood that while the output of oscillator 82 has been shown and described as being amplitude modulated, other well known modulation techniques such as frequency modulation, can be utilized in accordance with the teachings of this invention.

During a test sequence, control network 52 will cause a burst signal from either oscillator 56 or oscillator 58 to be applied through combining network 20 to the cable system. The short burst signal will then be received by all of the monitor networks. Each monitor network will detect the test signal as it is received at each individual location. The resultant detected signal will then amplitude modulate each of the CW oscillators which are tuned to oscillate at different discrete frequencies identifiable at the central office with the particular location of each monitor.

All of the return signals will be received by receiver 44 and will be fed through percent modulation detector 46 to the storage and display circuit 48. Control network 52 cooperates with receiver 44 to enable manual or automatic tuning of the receiver so that the modulated returns from each individual monitor in the system can be stored, displayed and analyzed. If a portion of the cable network is defective or operating improperly, the signal detected by the monitor associated with that section of the system will return a signal for which the percentage of modulation deviates from the norm. Furthermore, since each of the monitor oscillators has a stable signal level output, any detected deviation in the expected amplitude of the return signals will indicate a problem in the return signal path of the system. In this manner, faults both in the forward and in the reverse directions can be immediately detected so that proper corrective measures can be taken.

Since the test signals as well as conventional communications signals will be applied to the network at the same time, it is desirable to minimize interference. To this end, carrier oscillators 56 and 58 can be selected to have fixed output frequencies lying either slightly below or slightly above the conventional television signal frequencies or lying within the intermediate band around approximately 108 mHz. If the control network 52 is designed with appropriate timing networks to provide a continuous train of short burst output signals from one or both of oscillators 56 and 58, these short duration bursts of signals will be negligibly perceptible to the cable subscriber. In this manner, all of the monitors can be sequentially examined on a continuous basis without interference.

If the return signals resulting from the transmission of bursts from oscillators 56 and 58 indicate that a fault exists on a particular portion of the system, control network 52 may be caused to energize sweep generator 60 for the transmission of a frequency swept signal through the line. As was the case with the carrier oscillators 56 and 58, the amplitude of the sweep generator 60 output will be precisely established and will lie within a range of approximately 10–15 db above the normal communication signals which will result in a relatively high level return from the monitor circuits of the network. Receiver 44 is then tuned to the discrete frequency associated with the monitor in the network portion in which a fault had previously been detected so that a full frequency response pattern can be displayed by oscilloscope 50.

By using a broadband detector in the monitor circuit 40, the system according to the present invention is capable of detecting not only discrete frequency test signals but also frequency swept signals. The amplitude modulated frequency spectrum signal returned by the monitor thus provides a greater scope or range of information from which the particular fault can be deduced without having to travel to the location of the cable section under observation.

It can be appreciated that the foregoing system and method enables full dynamic monitoring of any number of trunk or feeder line sections as well as any number of amplifiers and tap off devices without undue complexity and with minimal interference with normal communications through the system. Each individual monitor circuit is simple in design and construction and is economical to install and maintain.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. Apparatus for monitoring a communication system in which information signals are transmitted within a particular frequency band, comprising, in combination:
   means generating test signals falling within said particular frequency band for transmission over the communication system simultaneously with the information signals, said test signal generating means including first oscillator means generating as a first output a carrier signal at a first fixed frequency within said frequency band, second oscillator means generating as a second output a signal swept across at least a portion of said frequency band, and control means coupled to said first and second oscillator means for determining the particular output of said test signal generating means;
   a plurality of monitor circuits each in communicative connection with said test signal generating means and each disposed at different preselected points in the system, each said monitor circuit including:
      detector means for detecting all signals in said frequency band as received at the respective point of said monitor circuit,
      local oscillator means for generating a local carrier signal at a discrete fixed frequency falling outside said frequency band, the carrier frequency of the oscillator of each monitor circuit being different so that the identity and location of each said monitor circuit can be recognized, and
      modulator means coupled to said detector means and said local oscillator means for modulating said local carrier with said detected signals; and
   signal analysis means in communicative connection with said monitor circuits and disposed at a position remote therefrom to receive and analyze said modulated local carriers, said signal analysis means including means for selectively receiving the individual modulated local carriers of each of said monitor circuits, means for detecting the percent of modulation of each of said received local carrier signals, means for storing the output of said percent of modulation detector, and oscilloscope means for displaying the frequency response of each received local carrier signal;
   the amplitudes of said test signals generated by said first and second oscillator means being greater than said information signals such that modulated local carrier signals received by said signal analysis means and resulting from the transmission of either of said test signals may be differentiated from received modulated local carrier signals resulting from the transmission of information signals, whereby the operative status of the entire system may be monitored at a central location.

2. Apparatus for monitoring a communication system as recited in claim 1, wherein said communicative connections include coaxial cable means.

3. Apparatus for monitoring a communication system as recited in claim 1, wherein said local carrier signal generated by said local oscillator means has fixed, stable amplitude; and wherein said signal analysis means analyzes the amplitude of said modulated carrier.

4. Apparatus for monitoring a communication system as recited in claim 1, wherein each said monitor circuit includes a forward circuit path including said detector means, and a reverse circuit path including said local oscillator means and said modulator means, said forward circuit path comprising a high pass filter, a broadband detector connected to an output of said high pass filter, and an amplifier connected to an output of said broadband detector; and said reverse circuit path comprising an oscillator, an amplitude modulator connected to an output of said oscillator, and a low pass filter connected to an output of said amplitude modulator.

5. Apparatus for monitoring a communication system as recited in claim 4, wherein said modulator means comprises a diode coupled to said oscillator means, said diode being further coupled to said detector means such that the state of conduction of said diode is responsive to the amplitude of said detected signals.

6. A method of monitoring a communication system in which information signals are transmitted within a particular frequency band of the communication system frequency spectrum, comprising the steps of:

(a) generating at least one test signal having an amplitude greater than said information signals and a fixed frequency falling within said particular frequency band;

(b) generating a test signal having a frequency swept at least partially across said particular frequency band;

(c) transmitting pulse bursts of said fixed frequency test signal over the communication system simultaneously with the transmission of information signals;

(d) detecting all signals in said particular frequency band as received at a plurality of points in the system;

(e) generating at each point a carrier signal having a different discrete frequency falling outside said particular frequency band and within the communication system frequency spectrum;

(f) modulating each of said carrier signals with the respective signals detected at each point;

(g) transmitting said modulated carrier signals back through the system to a central location;

(h) receiving and separately analyzing each of said modulated carrier signals at said central location to determine the existence and location of a fault; and, when a fault is detected;

(i) transmitting said frequency swept band of test signals over the communication system;

(j) repeating steps (d) through (g); and (k) receiving the modulated carrier signals from the point of said detected fault and examining the frequency spectrum thereof.

7. A monitoring method as recited in claim 6, wherein said carrier signal generating step comprises generating a carrier signal having a stable amplitude; and wherein said receiving and analyzing step comprises analyzing the amplitude of said modulated carrier signal.

* * * * *